E. GESCHKE.
MEANS FOR INTRODUCING BALLS INTO BALL BEARINGS.
APPLICATION FILED JULY 29, 1908.
941,632.
Patented Nov. 30, 1909.
2 SHEETS—SHEET 1.
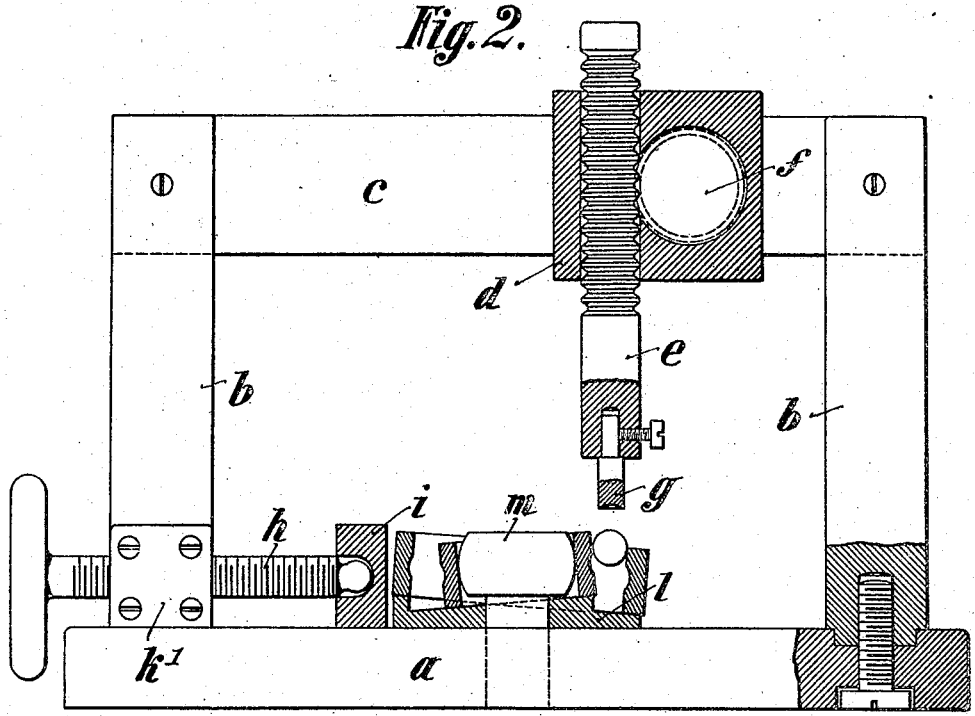
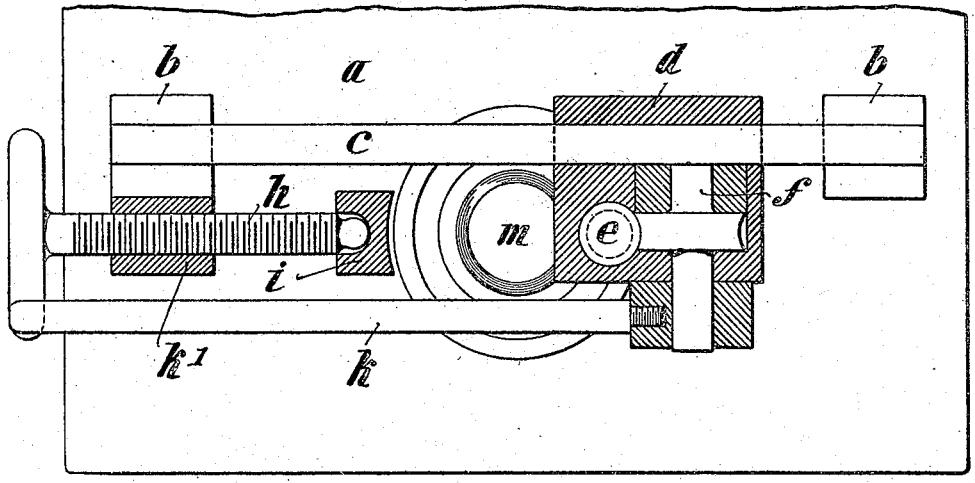
WITNESSES:
Fred White
René Buine
INVENTOR:
Ernst Geschke,
By Attorneys, E. GESCHKE.
MEANS FOR INTRODUCING BALLS INTO BALL BEARINGS.
APPLICATION FILED JULY 29, 1908.
941,632.
Patented Nov. 30, 1909.
2 SHEETS—SHEET 2.
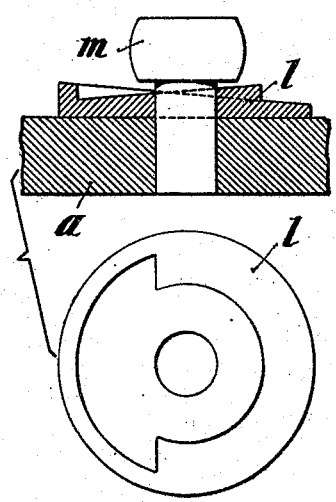
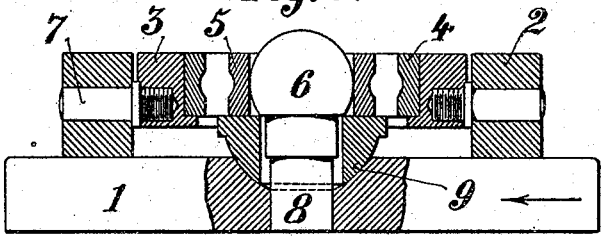
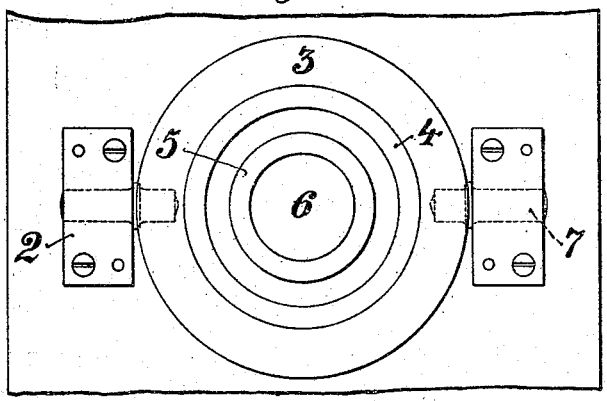
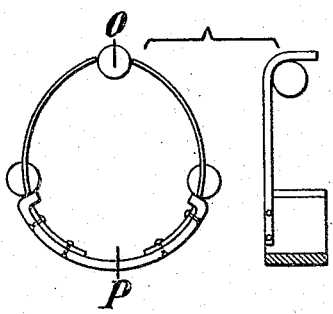
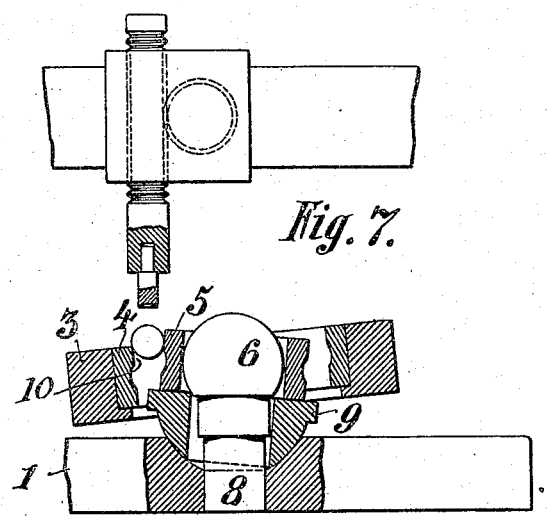
INVENTOR:
Ernst Geschke,
By Attorneys,
WITNESSES

UNITED STATES PATENT OFFICE.

ERNST GESCHKE, OF TEGEL, NEAR BERLIN, GERMANY.

MEANS FOR INTRODUCING BALLS INTO BALL-BEARINGS.

941,632.

Specification of Letters Patent.  Patented Nov. 30, 1909.

Application filed July 29, 1908.  Serial No. 446,004.

*To all whom it may concern:*

Be it known that I, ERNST GESCHKE, workmaster, subject of the German Emperor, residing at Hermsdorferstrasse 4, Tegel, near Berlin, Germany, have invented new and useful Improvements in or Connected With Means for Introducing Balls into Ball-Bearings, of which the following is a specification.

The invention relates to improvements in or connected with means for introducing balls into ball bearings.

As is well known the more balls a ball bearing possesses the more valuable will the said ball bearing be, owing to its greater supporting capacity.

In ball bearings having rings which are not provided with filling openings for the balls, or in which such openings are shallow the insertion of the balls is quantitatively restricted, unless artificial means are employed.

The object of the present invention is to obtain a device which permits of inserting the greatest possible number of balls in such ball bearings.

With this device it is possible to introduce all the balls between the rings without at any moment altering the concentric position of the same although there is no objection to insert the first balls in the usual manner with the rings in an eccentric position. In this latter case the new device is of more particular importance for the introduction of the last balls, which as is well known offers certain difficulties.

The method of working the new device depends on the fact that both the rings are tilted or inclined as regards each other so that their middle planes cut each other: thus the distance separating their working rims is increased at one point, or at two oppositely situated points, so that the balls can easily be inserted in the additional space thereby obtained.

It is also advisable to exert radial pressure on one of the rings or even on both of them thereby endeavoring to still further increase this intermediary space owing to the elastic properties of the rings.

I will now describe the invention with reference to the accompanying drawings which show two forms of construction of the device forming the subject of the present invention and in which:—

Figure 1 is a plan of the apparatus partly in section. Fig. 2 is a vertical section thereof. Figs. 3 and 4 are details of one form of construction. Figs. 5 and 6 are respectively a plan and vertical section of a modified form of construction in which the concentric position of both the rings is positively maintained during the introduction of all the balls and Fig. 7 illustrates the mutual tilting or inclining of the rings.

The device as shown in Figs. 1 and 2 consists of the base plate $a$ to which both the pillars or standards $b$ are fastened by means of screws or otherwise. Both the standards $b$ are connected together by the beam $c$ which latter at the same time carries the box $d$. The latter is movable in a horizontal direction on the beam $c$: the rack rod $e$ is moved up and down by the toothed wheel $f$ both of which are arranged in the box $d$. The toothed wheel $f$ is actuated by means of the lever $k$ rigidly fixed to it. To the rack rod $e$ a plunger or pin $g$ is fitted in the lower end of which a recess, exactly corresponding to the surface of the ball, is formed. It will be understood that the rack rod $e$ could be moved up and down in other ways, for example by means of eccentric disks, a crankshaft, a toothed wheel with crank pin, by means of inclined planes, by simple lever pressure and the like.

The double inclined disk $l$ and the ball headed pin $m$ are arranged on the base plate $a$ and both serve for receiving the ball bearing for the purpose of inserting the balls. A separate disk $l$ and a ball headed pin $m$ are provided for each different size of ball bearing. The introduction of all or part of the balls into the ball bearings is effected by placing the double inclined disk $l$ as well as the ball headed pin $m$ which corresponds to the size of the bearing to be filled on the base plate $a$, the ball headed pin $m$ engaging in the bore of the inner ring of the bearing; then both the rings of the ball bearing are brought into the correct position and if required the hoop shown in Fig. 4 which divides the balls already in the bearing into two parts and maintains the same at exact distances from each other is inserted. Of course instead of this hoop any other suitable device may be used for separating the balls.

The ball to be inserted into the bearing is placed on the latter at the spot at which recesses have been turned in the rings and then the box $d$ is moved along the beam $c$ until the plunger or pin *g* is situated centrally above the ball to be inserted.

Now if strong pressure is exerted against the outer ring of the ball bearing by means of the screw *h* which passes through the nut $h^1$ provided on one of the standards *b* and if at the same time the ball is pressed on by means of the pin *g* then both the rings will be pressed on to the inclined surfaces of the double inclined disk situated beneath them and consequently the outer ring will be tilted or inclined to the right and the inner ring tilted to the left while at the same time both rings can be firmly pressed together by the screw *h*. By tilting and pressing together the rings a relatively larger space is formed between the two rings so that in combination with the elasticity of the outer ring it is possible to insert the balls into the ball race.

It is not necessary to construct the device in the manner illustrated, since other arrangements may be provided for accomplishing the same result.

The construction of the modified form of the device shown at Figs. 5 to 7 is as follows:—In a base plate 1 and at two bearing spots 2 of the same, a ring 3 is supported by means of two pivots 7 and can rotate upon these pivots. The ring 3 serves to receive the outer ball bearing ring 4 and prevents any lateral displacement of the latter.

The inner ball bearing ring 5 is supported on a disk 9 the under side of which is hemispherical and is supported in a cup in the base plate 1 so that it is free to turn in the latter in all directions. A ball headed pin 6 occupies the interior of the inner ring 5 of the ball bearing maintaining the same in position and is itself held in place by means of a prolongation 8 passing into the base plate 1. This ball headed pin 6 prevents any eccentric displacement of the ring 5.

The balls are inserted in the following manner: The parts 3 and 5 are mutually tilted as regards each other, this being effected either by hand or by the intermediary of any suitable means, and if desired firmly fixed in the most suitable position (see Fig. 7) so that the greatest intermediary space exists about at 10. The balls are inserted into this intermediary space one after the other with or without the use of pressure. On inserting the last ball both the rings of the ball bearing are returned into their normal position.

With this device also special press stamps or rams or the like may be used.

The rings may be either altogether unbroken or not provided with filling openings or recesses of such depth may be formed therein that the balls can be inserted by means of pressure or even without using pressure but naturally this pressure will be less than when using unrecessed rings of the same shoulder height, that is to say the distance from the edge of the recess to the edge of the ring itself. The depth of the recesses, however, should be so slight that when the rings are in the normal position, that is to say when they are not tilted, it would be impossible to directly insert or remove any of the balls. This thus constitutes a difference between the present bearings and bearings with completely broken rings.

What I claim as my invention, and desire to secure by patent is:

1. A device for inserting balls in ball bearings comprising means for holding the rings of the bearing in relatively tilted position, a frame for holding such means, and a screw device connected with said frame for placing a lateral pressure on the outer ring.

2. A device for inserting balls in ball bearings comprising means for holding the rings of the bearing in relatively tilted positions, and a plunger adapted to press a ball between such rings.

3. A device for inserting balls in ball bearings comprising means for holding the rings of the bearing in relatively tilted positions, a plunger adapted to press a ball between such rings, and means for adjusting the plunger radially of the bearing.

In testimony whereof I have signed my name to this specification in the presence of two subscribing witnesses.

ERNST GESCHKE.

Witnesses:
 HENRY HASPER,
 WOLDEMAR HAUPT.